United States Patent
Yokouchi et al.

(10) Patent No.: US 8,180,510 B2
(45) Date of Patent: May 15, 2012

(54) CONTROL APPARATUS OF VEHICLE DRIVE APPARATUS AND PLUG-IN HYBRID VEHICLE

(75) Inventors: Yoshimitsu Yokouchi, Toyota (JP); Hideto Watanabe, Toyota (JP); Kunio Takeda, Kariya (JP); Masayuki Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 500 days.

(21) Appl. No.: 12/449,036

(22) PCT Filed: Jan. 16, 2009

(86) PCT No.: PCT/JP2009/050509
§ 371 (c)(1),
(2), (4) Date: Jul. 21, 2009

(87) PCT Pub. No.: WO2009/098919
PCT Pub. Date: Aug. 13, 2009

(65) Prior Publication Data
US 2010/0262322 A1    Oct. 14, 2010

(30) Foreign Application Priority Data
Feb. 7, 2008    (JP) ................................. 2008-027956

(51) Int. Cl.
*B60W 20/00* (2006.01)
*B60L 11/18* (2006.01)

(52) U.S. Cl. .......................................... 701/22; 903/903
(58) Field of Classification Search .................... 701/22; 180/65.28, 167; 340/425.5; 909/909
See application file for complete search history.

(56) References Cited

U.S. PATENT DOCUMENTS

| 7,698,053 B2* | 4/2010 | Mori ............................. 701/112 |
| 7,744,501 B2* | 6/2010 | Lecole et al. ...................... 477/5 |
| 2004/0159479 A1 | 8/2004 | Morimoto et al. |

FOREIGN PATENT DOCUMENTS

| JP | A-2000-238555 | 9/2000 |
| JP | A-2004-225576 | 8/2004 |
| JP | B2-3722102 | 11/2005 |
| JP | A-2007-239590 | 9/2007 |

* cited by examiner

*Primary Examiner* — Thomas Black
*Assistant Examiner* — Marthe Marc-Coleman
(74) *Attorney, Agent, or Firm* — Oliff & Berridge, PLC (57) ABSTRACT

A hybrid control controller stores vehicle speed influence values that have been set according to vehicle speeds, a first threshold value of a sum value of the vehicle speed influence values, a second threshold value lower than the first threshold value, and an engine start reference vehicle speed, and during EV running, sums the vehicle speed influence values from moment to moment. The hybrid control controller starts the engine in a case where the sum value is no less than the first threshold value, and in a case where the sum value is no less than the second threshold value and the vehicle speed is no more than an engine start reference vehicle speed.

6 Claims, 6 Drawing Sheets

CONTROL APPARATUS OF VEHICLE DRIVE APPARATUS AND PLUG-IN HYBRID VEHICLE

TECHNICAL FIELD

The present invention relates to a control apparatus of a hybrid vehicle drive apparatus and a plug-in hybrid vehicle provided with this control apparatus. More specifically, the invention relates to a control apparatus of a vehicle drive apparatus installed in a hybrid vehicle having an oil pump that is driven by an output shaft of an engine, and a plug-in hybrid vehicle provided with this control apparatus.

BACKGROUND ART

As disclosed for example in Patent Documents 1 and 2, ordinary drive apparatuses provided in a hybrid vehicle include engines such as gasoline engines or diesel engines, and electric motors such as motors or motor/generators. Engines and electric motors are combined in various forms, and the number of electric motors used is not limited to one; multiple electric motors are sometimes used.

Patent Documents 1 and 2 disclose hybrid vehicles in which two electric motors are used. In these hybrid vehicles, an engine, a first motor/generator and a second motor/generator are linked to each other via a power division mechanism constituted from a planetary gear mechanism. Power of a ring gear of the planetary gear mechanism is transmitted to drive wheels via a power transmission mechanism. Thus, power of one or both of the engine and the second motor/generator can be output to the drive wheels.

In this type of hybrid vehicle, by controlling driving and stoppage of the engine and the motor/generators based on various conditions, running is possible by engine running, which is a running mode of running by driving only the engine, EV running, which is a running mode of running by driving only the motor/generators while not driving the engine, or engine/motor running, which is a running mode of running by driving both the engine and the motor/generators. Switching between these running modes can be performed automatically, or by manual operation of a driver.

When switching from EV running to engine/motor running, starting of the stopped engine is performed by an engine start control apparatus. At that time, the engine start control apparatus executes cranking by powering the first motor/generator, which is coupled to the engine. When the engine reaches a predetermined revolutions, fuel injection and ignition are performed to start operation of the engine.

In the hybrid vehicle, starting/stopping of the engine is repeatedly executed during running. Accordingly, in order to insure a comfortable ride, smooth starting of the engine is sought. In order to realize smooth engine starting, fuel injection and ignition are performed after the engine revolutions have been increased by cranking to near the revolutions of self-sustaining operation. At this time, engine torque fluctuation, specifically torque fluctuation due to initial firing of the engine, is transmitted as torsional vibration via the crankshaft to various power transmission mechanisms such as the power division mechanism constituted from the planetary gear mechanism. In order to absorb this vibration, a damper that absorbs vibration is provided between the crankshaft and an input shaft. Further, in order to absorb vibration transmitted to the power division mechanism that cannot be absorbed by the damper, torque control of an electric motor (in the hybrid vehicle disclosed in Patent Documents 1 and 2 for example, the second motor/generator corresponds to this electric motor) made capable of power transmission in a power transmission path from the engine to the drive wheels is performed so that vibration that has reached the power division mechanism is absorbed. That is, a hybrid control controller that controls driving of the engine and the electric motors via an engine control apparatus and an electric motor control apparatus performs control in which an optimal corrected torque value is calculated from revolution position information, engine revolutions information, preprogrammed torsional rigidity of each component, inertia moment, hysteresis values, and so forth of the above electric motors, and the torque of the electric motors is corrected to increase or decrease. Thus, even comparatively large vibration due to engine initial firing or the like that has reached the power division mechanism is reduced. As a result, vibration that is transmitted to a differential, a drive shaft, a body, or the like on the downstream side from the power division mechanism also is reduced, and so ride comfort of the driver is improved.

Incidentally, in a hybrid vehicle, often an oil lubrication mechanism is provided in which an oil pump is operated by rotation of an engine output shaft, and supplies lubricating oil from this oil pump to the power division mechanism or the like. During EV running, the engine and the oil pump are both stopped, so this type of oil lubrication mechanism stops supplying lubricating oil to the power division mechanism during EV running. When such a state continues for a long time, there is a risk that heat damage will occur due to inadequate lubrication within the power division mechanism.

Therefore, in the hybrid vehicle disclosed in Patent Document 2, during EV running, rotational torque of the first motor/generator is transmitted to a rotating shaft for operating the oil pump at a predetermined timing, and thus the oil pump is operated for a fixed period of time to supply lubricating oil to the power division mechanism and the like. With this configuration, even during EV running of the hybrid vehicle, lubricating oil is supplied to the power division mechanism for the necessary time period at an appropriate timing, thus preventing heat damage to components to which supply of lubricating oil is stopped while operation of the oil pump is stopped.

PRIOR ART DOCUMENT

Patent Document

Patent Document 1: JP 2000-238555A
Patent Document 2: JP 3722102B

SUMMARY OF INVENTION

Problem to be Solved by the Invention

Incidentally, if during EV running the engine is forcibly started and the oil pump is operated for a fixed period of time, the problems of heat damage to components where lubricating oil is supplied by the oil pump and sliding resistance of the engine are solved. However, when the engine is started during EV running with the vehicle in a high speed range, it is difficult for torque fluctuation (torsional vibration) transmitted from the engine to be absorbed using torque control of an electric motor made capable of power transmission in a power transmission path from the engine to the drive wheels. The reason for this is that while running in a high speed range, the revolutions of the electric motor are high, so correction to increase or decrease the torque of the electric motor is likely to be delayed from the optimal timing, and as a result it will not be possible to adequately absorb the above vibration.

Thus, vibration that is transmitted to a differential, a drive shaft, a body, or the like on the downstream side from the power division mechanism cannot be reduced, and so ride comfort worsens.

Also, there is a possibility that due to the correction to increase or decrease the torque of the electric motor being delayed from the optimal timing, rotational synchronization of the electric motors and the engine will be offset, so that a noise of gear grinding between the gear elements within the power division mechanism occurs.

The present invention was made in view of these problems, and it is an object thereof to provide, in a plug-in hybrid vehicle having an oil pump that operates in conjunction with rotation of an output shaft of an engine, and is provided with EV running as a running mode, a control apparatus of a vehicle drive apparatus that, by starting the engine at an appropriate timing during EV running, increases the frequency of suppressing noise and vibration caused by torque fluctuation of the engine, and in addition, makes it possible to prevent heat damage of components where lubricating oil is supplied by an oil pump while insuring continuous running distance by EV running as much as possible, and also to provide a plug-in hybrid vehicle having this control apparatus.

Means for Solving Problem

As a means for addressing the above problems, the control apparatus of a vehicle drive apparatus of the invention is configured in the following manner. That is, the invention provides a control apparatus of a vehicle drive apparatus having a power transmission apparatus for transmitting power of an electric motor to a drive wheel, and an engine linked to the power transmission apparatus, in which EV running that is a running mode of running by only the electric motor while not driving the engine is possible, the control apparatus being provided with: a storage means that stores vehicle speed influence values that have been set according to vehicle speeds, a first threshold value of a sum value of the vehicle speed influence values, a second threshold value of the sum value of the vehicle speed influence values that is lower than the first threshold value, and an engine start reference vehicle speed; a summing means that, when the running mode of the vehicle is EV running, sums the vehicle speed influence values corresponding to vehicle speeds from moment to moment; an engine start judging means that judges whether or not starting of the engine is necessary during EV running; an engine starting means that starts the engine when the engine start judging means has judged that starting of the engine is necessary; and a vehicle speed detecting means that detects the vehicle speed. The engine start judging means judges that it is necessary to start the engine in a case where the sum value summed by the summing means is no less than the first threshold value, and in a case where the sum value summed by the summing means is no less than the second threshold value and the vehicle speed detected by the vehicle speed detecting means is no more than the engine start reference vehicle speed, and otherwise the engine start judging means judges that it is not necessary to start the engine.

Also, the moment to moment sum by the summing means of the vehicle speed influence values that correspond to the vehicle speeds of the vehicle may be a sum at a fixed time interval of the vehicle speed influence values that correspond to the vehicle speeds of the vehicle. Here, the vehicle speed may be either an instantaneous vehicle speed at each occurrence of a fixed time interval, or an average vehicle speed at each occurrence of a fixed time interval.

When the above control apparatus of a vehicle drive apparatus is installed in a hybrid vehicle having an oil pump that operates in conjunction with the output shaft of the engine, when the sum value of the vehicle speed influence values during EV running is no less than the first threshold value, with the engine start judging means and the engine starting means, the stopped engine is started and lubricating oil is supplied by the oil pump. Accordingly, by setting the first threshold value and the vehicle speed influence values corresponding to vehicle speeds in consideration of the allowable amount of non-lubrication of components where lubricating oil is supplied by the oil pump, it is possible to prevent heat damage of those components while insuring continuous running distance by EV running as much as possible. Also, because the oil pump is operated by starting the engine, there is no occurrence of energy loss due to sliding resistance of the engine, which can occur in a conventional hybrid vehicle.

Also when the sum value of the vehicle speed influence values during EV running is no less than the second threshold value and the vehicle speed is no more than the engine start reference vehicle speed, with the engine start judging means and the engine starting means, the stopped engine is started and lubricating oil is supplied by the oil pump. Accordingly, by setting the engine start reference vehicle speed somewhat lower, it is possible to suppress the revolutions of the electric motor to a low level when starting the engine. For example, when the above control apparatus of a vehicle drive apparatus is installed in a hybrid vehicle in which a control whereby engine torque fluctuation is absorbed on the electric motor side is performed, revolutions of the electric motor are low when starting the engine during EV running, so a delayed response in the above control is unlikely to occur, and it is easy to adequately absorb even a comparatively large torque fluctuation due to initial firing of the engine. Also, because such a delayed response is unlikely to occur, it is also unlikely that there will be an offset of rotational synchronization of the electric motor and the engine, so there is little possibility that a gear grinding noise will occur between gear elements within the power transmission apparatus such as the power division mechanism.

Also, in the control apparatus of a vehicle drive apparatus of the invention, in the above configuration, it is desirable that the vehicle speed influence values are set to higher values at high speeds than at low speeds. In ordinary gearwheel elements, gear elements, or the like, the allowable time for not supplying lubricating oil is shorter as vehicle speed increases, i.e., as revolutions increase. Therefore, according to the invention, it is possible to operate the oil pump at a more appropriate timing.

The plug-in hybrid vehicle of the invention is provided with any of the above control apparatuses of a vehicle drive apparatus; and a charging apparatus for receiving power supply from a household power source and charging a battery for the electric motor.

This plug-in hybrid vehicle can run continuously by only EV running by receiving power supply from an appropriate household power source, so the opportunities for being able to obtain the working effects of the above control apparatus of a vehicle drive apparatus increase when a driver proactively selects EV running.

Effects of the Invention

By applying the invention in a hybrid vehicle having an oil pump that operates in conjunction with rotation of an output shaft of an engine, and is provided with EV running as a running mode, it is possible, by starting the engine at an appropriate timing, to increase the frequency of suppressing noise and vibration caused by torque fluctuation of the engine, and in addition, it is possible to prevent heat damage of components where lubricating oil is supplied by an oil pump while insuring continuous running distance by EV running as much as possible.

BRIEF DESCRIPTION OF DRAWINGS

FIG. 2-1 is an expanded view of part of FIG. 2.

DESCRIPTION OF REFERENCE NUMERALS

MG1 Generator (electric motor)
MG2 Motor (electric motor)
1 Transaxle (power transmission apparatus)
2 Engine
18 Household power plug
19 Charging circuit (charging apparatus)
33 Hybrid control controller
35 Vehicle speed sensor
42 First map (vehicle speed influence value)
43 Second map
43a First threshold value
43b Second threshold value
43c Engine start reference vehicle speed

MODE FOR CARRYING OUT THE INVENTION

Following is a description of a control apparatus of a vehicle drive apparatus and a plug-in hybrid vehicle provided with this control apparatus according to an embodiment of the invention, with reference to the drawings. In this embodiment of the invention, by way of example, a plug-in hybrid vehicle is described that is provided with two motor/generators (electric motors), and is configured as an FF (front engine/front drive) vehicle. The control apparatus of the vehicle drive apparatus according to this embodiment of the invention is mainly configured with an ECU 31, a motor controller 32, a hybrid control controller 33, and so forth, described below. The plug-in hybrid vehicle is equipped with a charging apparatus for charging motor/generator batteries, and has a function whereby charging is also possible from a household power source. Below, the plug-in hybrid vehicle is referred to as simply a hybrid vehicle.

Figure 1:
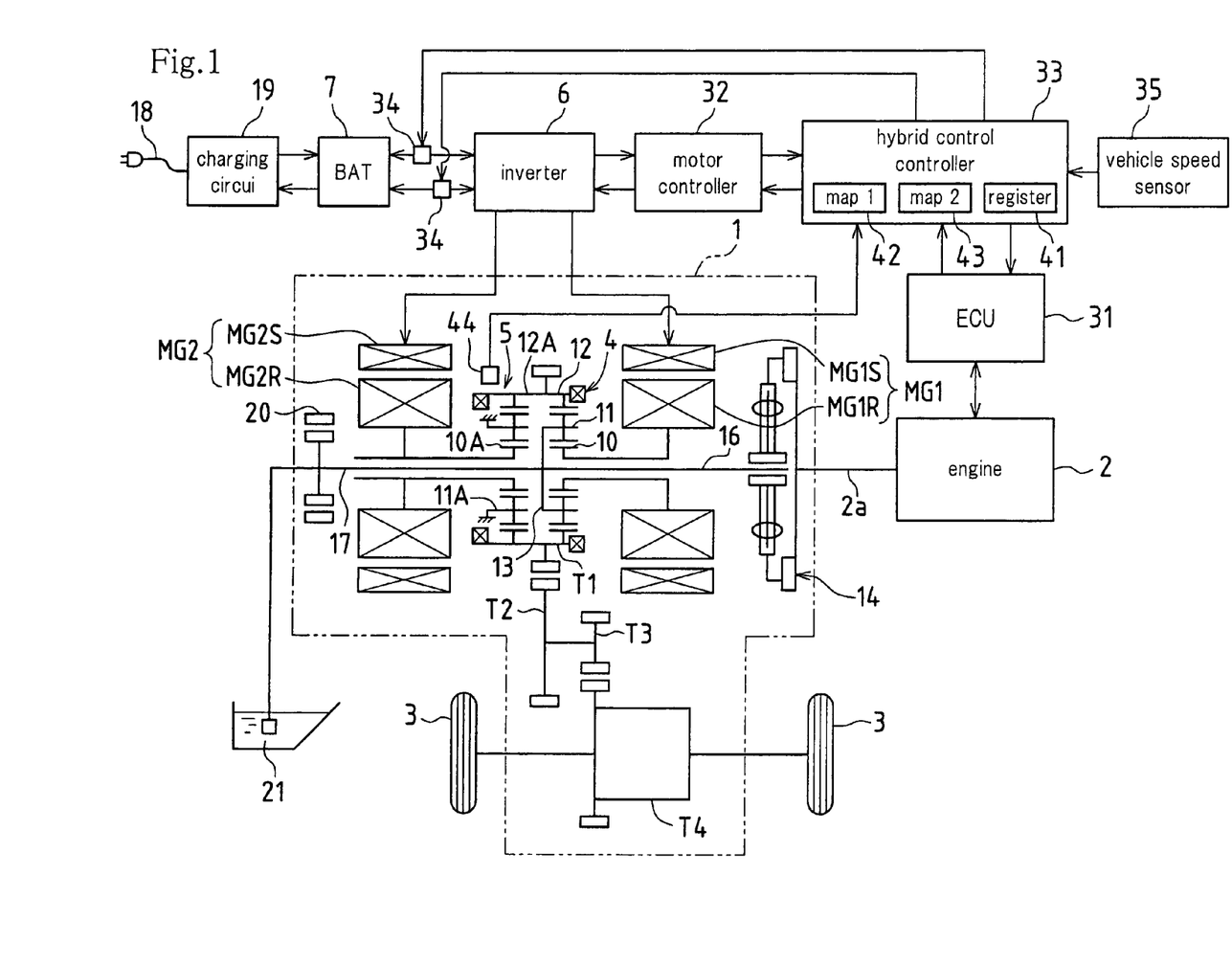
FIG. 1 schematically shows a power system and so forth of a transaxle 1 of a plug-in hybrid vehicle according to an embodiment of the invention.
Figure 2:
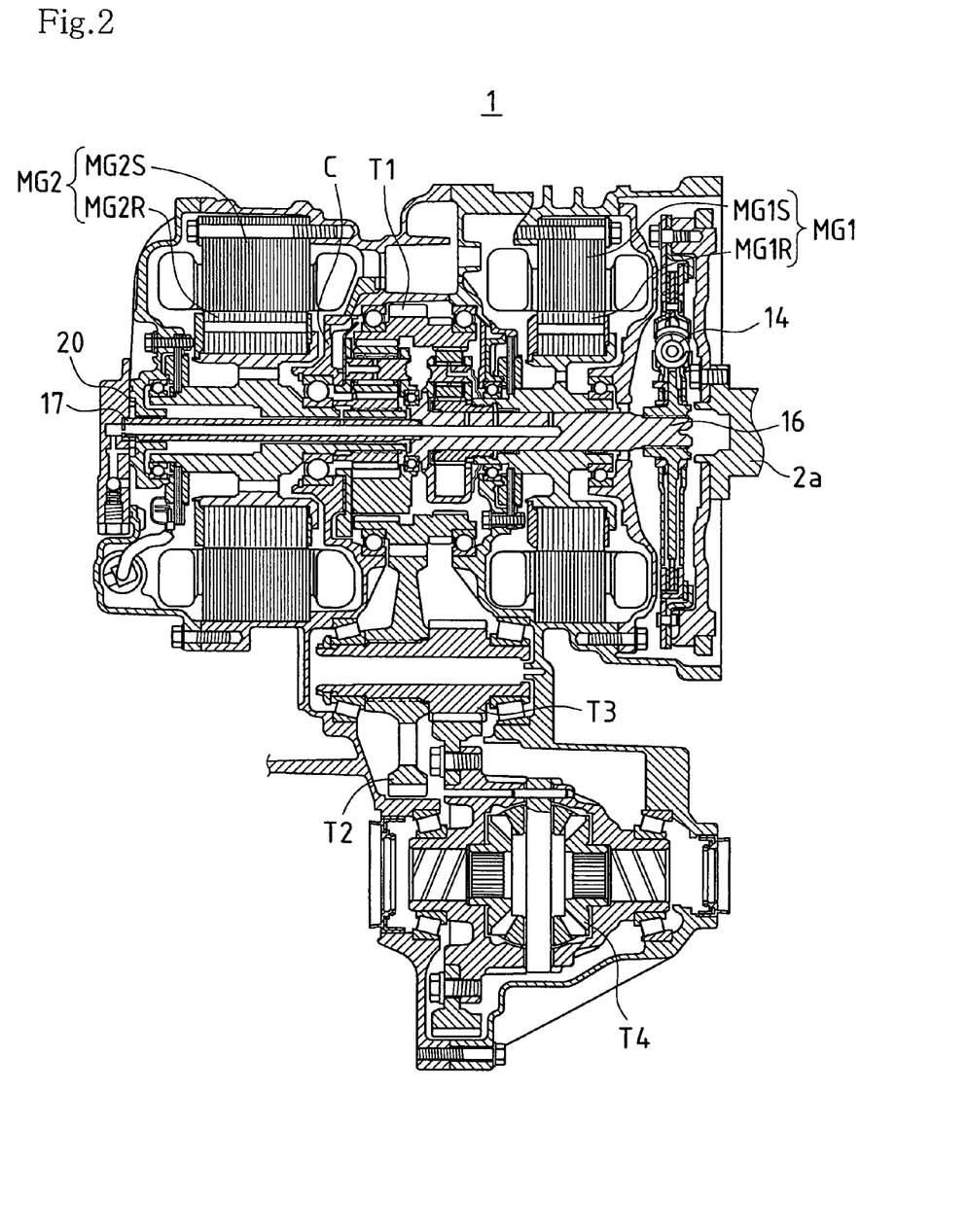
FIG. 2 is a lateral cross-sectional view that shows the configuration of the transaxle in FIG. 1 in detail.

FIG. 1 includes a skeleton view that schematically shows the power system of a transaxle 1 and the like of the hybrid vehicle. FIG. 2 is a lateral cross-sectional view that shows the configuration of the transaxle 1 in FIG. 1 in detail.

As shown in FIG. 1, the transaxle 1 of the hybrid vehicle is configured to include a motor/generator MG1 (referred to below also as a 'generator MG1') that functions mainly as a power generator, a motor/generator MG2 (referred to below also as a 'motor MG2') that functions mainly as an electric motor, a power division mechanism 4, a reduction mechanism 5, and a differential T4. An engine 2 is linked to the transaxle 1 via a crankshaft 2a (output shaft or the like of the engine 2), and the transaxle 1 functions as a power transmission apparatus for transmitting power of the motor MG2 and the engine 2 to drive wheels 3.

A planetary gear mechanism of the power division mechanism 4 is provided with a sun gear 10 that is an outer-toothed gear that turns at the center of a plurality of gear elements, a pinion gear 11 that is an outer-toothed gear that revolves while turning through the vicinity of the sun gear 10 while in outer contact with the sun gear 10, a ring gear 12 that is an inner-toothed gear formed as a hollow ring so as to engage with the pinion gear 11, and a planetary carrier 13 that journals the pinion gear 11 and turns via revolving of the pinion gear 11. The power division mechanism 4 transmits power that is output from at least one of the engine 2 and the motor MG2 to the drive wheels 3 via a counter drive gear T1, a counter driven gear T2, a final ring gear T3, and the differential T4.

A planetary gear mechanism of the reduction mechanism 5 is provided with a sun gear 10A that is an outer-toothed gear that turns at the center of a plurality of gear elements, a pinion gear 11A that is an outer-toothed gear that is axially supported by a carrier C (transaxle case) and turns while in outer contact with the sun gear 10, and a ring gear 12A that is an inner-toothed gear formed as a hollow ring so as to engage with the pinion gear 11A. The ring gear 12 of the power division mechanism 4, the ring gear 12A of the reduction mechanism 5, and the counter drive gear T1 are integrated as a single body. The reduction mechanism 5 reduces the power that is output from at least one of the engine 2 and the motor MG2 at an appropriate reduction ratio, and transmits the reduced power to the drive wheels 3 via the counter drive gear T1, the counter driven gear T2, the final ring gear T3, and the differential T4.

The differential T4 is a two-pinion-type differential, and transmits the power that is input from the final ring gear T3 by distributing that power to the left and right wheels 3 as necessary.

Rotational torque generated by driving the engine 2 is transmitted to an input shaft 16 via the crankshaft 2a and a coil spring-type transaxle damper 14. An oil pump 20 is disposed on the axis line of the input shaft 16 via a hollow shaft 17, and the oil pump 20 operates by receiving supply of rotational torque of the input shaft 16. A trochoid-type pump, gear-type pump, or the like can be used as the oil pump 20. An oil pan 21 is filled with lubricating oil, and lubricating oil sucked out by the oil pump 20 is transported to the power system (power transmission apparatus) of each component such as the power division mechanism 4, then circulated among each gear element, and the rotating portion and the sliding portion of each shaft, so that the lubricating oil fulfills the roles of cooling each component, reducing frictional resistance, preventing corrosion, and maintaining airtightness.

Figure 21:
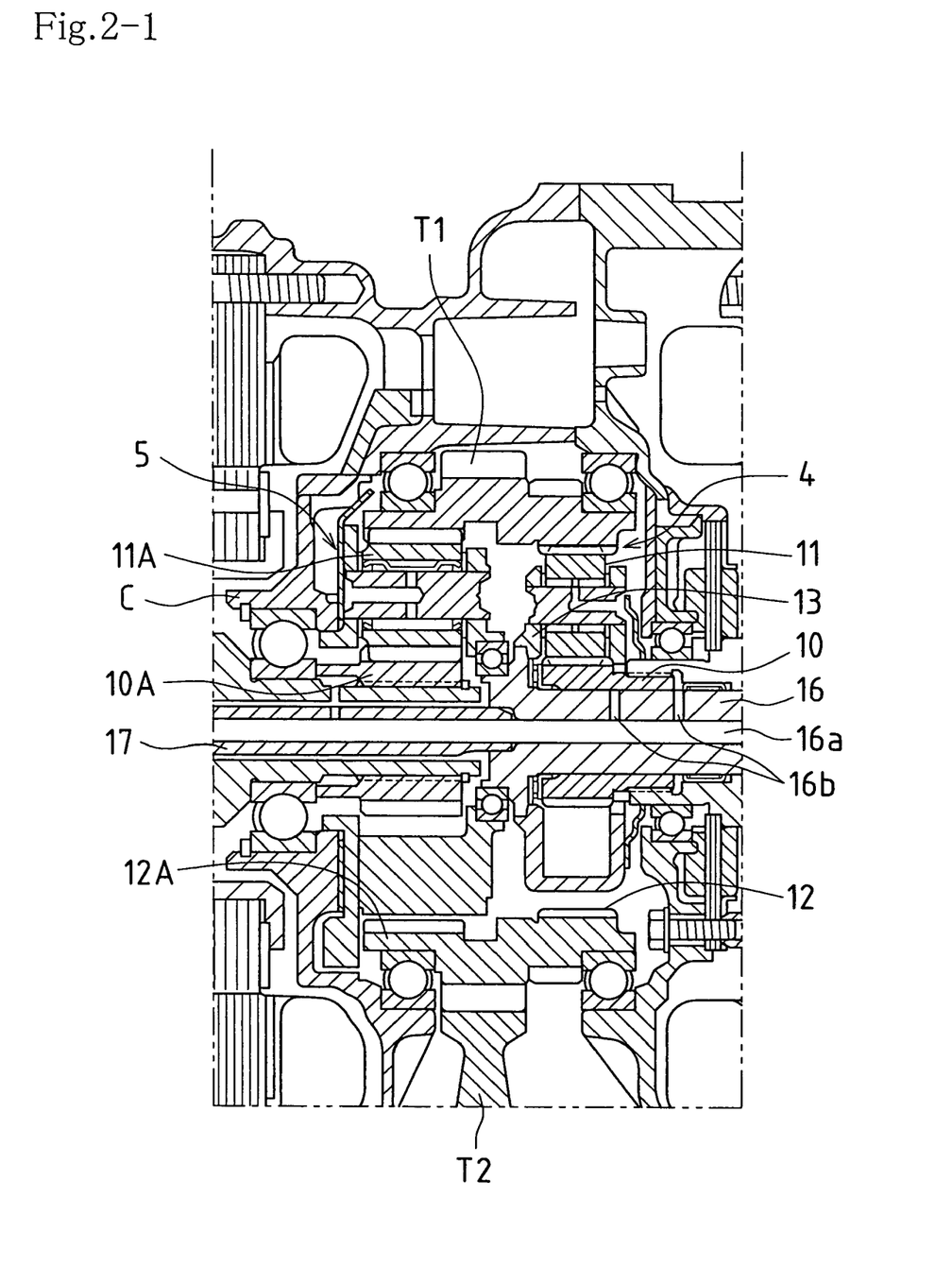

For example, in the transaxle 1 shown in the example in FIG. 2, and FIG. 2-1 which is an enlarged view of part of FIG. 2, a hollow shaft 17 (rotating shaft for operating the oil pump 20) that is rotated in order to operate the oil pump 20 is spline-fitted to the input shaft 16, and thus rotates as a single body with the input shaft 16. The oil pump 20 operates due to the input shaft 16 and the hollow shaft 17 rotating along with the crankshaft 2a of the engine 2. The operated oil pump 20 sucks out lubricating oil of the oil pan 21, and transports that lubricating oil to the power system of each component such as the power division mechanism 4 via the hollow shaft 17, and a hollow portion 16a and a spray hole 16b formed in the input shaft 16.

As for the connection configuration of each of the gear elements of the power division mechanism 4 and the reduction mechanism 5, the planetary carrier 13 is linked as a single body to the input shaft 16, the sun gear 10 is linked as a single body to a rotor MG1R described below, and the sun gear 10A is linked as a single body to a rotor MG2R described below.

The generator MG1 is an alternating current synchronous generator provided with the rotor MG1R constituted from permanent magnets that are rotatably supported by the input shaft 16, and a stator MG1S around which three-phase winding has been wound. The generator MG1 supplies power for charging of the generator MG1 and a motor MG2 battery 7 (below, simply the 'battery 7'), and for driving of the motor MG2, and changes the revolutions of the rotor MG1R by controlling the amount of electricity generated, thus realizing a continuously variable transmission function of the transaxle 1. Likewise, the motor MG2 is an alternating current synchronous generator provided with a rotor MG2R constituted from permanent magnets that are rotatably supported by the hollow shaft 17, and a stator MG2S around which three-phase winding has been wound. By supplying three-phase alternating current to the three-phase winding, a rotational magnetic field is generated within the motor, so that a predetermined rotational torque is output. The motor MG2 serves as an auxiliary power source of the engine 2, and other than assisting smooth vehicle starting movement and acceleration, converts vehicle operating energy to electrical energy when regenerative brake operation is performed, and charges the battery 7. The battery 7 may have a structure such that individual battery modules are appropriately connected in series so as to provide a necessary rated voltage.

A charging circuit (charging apparatus) 19 provided with a household power plug 18 is connected to the battery 7. The charging circuit 19 receives power supply from a household power source via the household power plug 18, and charges the battery 7.

As system controllers that control the power system described above, the engine electronic control unit (ECU) 31 that performs fuel injection control, ignition timing control, variable valve timing control, and so forth of the engine 2 from various sensor output of an unshown crank position sensor, cam position sensor, throttle position sensor, and so forth; a vehicle speed sensor (vehicle speed detection means) 35; the hybrid control controller 33 that obtains the necessary engine 2 output and torque of the motor MG2 and the generator MG1 from the output of the vehicle speed sensor 35, and an unshown accelerator opening degree sensor and shift position sensor and so forth, outputs requested values to the ECU 31 and a below motor controller 32, and performs control of the power system; and the motor controller 32 that controls the generator MG1 and the motor MG2 via an inverter 6 according to drive requested values from the controller 33; are prepared.

Incidentally, engine efficiency of the engine 2 is good when running a long distance at high output, with some amount of load on the engine 2, but engine efficiency is poor when there is a small load on the engine 2, such as when running at low speed. On the other hand, the motor MG2 has much low speed torque, and therefore is suitable for urban driving where vehicle starting movement or low speed running is common, but the running distance of the motor MG2 is short. In a hybrid vehicle, these characteristics are used to skillfully use the engine 2 and the motor MG2 differently according to the running circumstances, and by making good use of the respective strengths of the engine 2 and the motor MG2 while compensating for their weaknesses, power performance that is smooth and responsive is realized, and fuel consumption is improved.

For example, during vehicle starting movement or low speed running, the engine 2 is stopped, and power supply is received from the battery 7 to run by driving only the motor MG2 (also referred to as 'EV running' in this specification). Therefore, the hybrid controller 33 operates a relay 34 provided in the battery 7 to supply direct current high voltage power to the inverter 6. A three-phase bridge circuit configured with six power transistors for each of the motor MG2 and the generator MG1 is provided in the inverter 6, and switches between direct current and three-phase alternating current. Control of the power transistors is performed by the motor controller 32, and information necessary for current control such as an output current value is sent from the inverter 6 to the motor controller 32. The inverter 6 adjusts the amplitude and frequency of three-phase alternating current in order to adjust the output torque and revolutions of the motor MG2 to desired values, and supplies them to the motor MG2.

Note that EV running is automatically set by the hybrid control controller 33 when beginning vehicle movement or when running at low speed, but the hybrid control controller 33 can also forcibly set EV running regardless of the running state of the hybrid vehicle by receiving a predetermined manual operation of the driver.

During normal running, by driving the engine 2, part of the output of the engine 2 is transmitted to the drive wheels 3, and by using part of the remainder to generate electricity, the power obtained with the generator MG1 is used to drive the motor MG2 (also referred to as 'normal HV running' in this specification). In normal HV running, power distribution in the power division mechanism 4 is adjusted such that the engine 2 operates in a high torque range with a good rate of fuel consumption, thereby assisting output of the engine 2. The hybrid control controller 33 calculates necessary engine output from the amount the accelerator pedal is depressed and the vehicle speed, and calculates the engine revolutions from an optimal fuel efficiency line. Further, the hybrid control controller 33 controls the engine revolutions by performing electronic throttle opening degree control, and obtaining the revolutions of the generator MG1 from collinearity characteristics of the power division mechanism 4. Simultaneously, the hybrid control controller 33 calculates the torque that should be the responsibility of the motor MG2 from the necessary drive power of the drive wheels 3, and outputs a necessary requested value to the motor controller 32.

During high-load running, such as when running with full-open acceleration or when climbing a hill, in addition to the drive method during the above normal running, there is running in which power supply is received from the battery 7 to drive the motor MG2, and the output torque of the motor MG2 is increased to assist the output of the engine 2 (also referred to as 'high-load HV running' in this specification). The output torque of the motor MG2 can be adjusted by adjusting the current value of the three-phase alternating current that is supplied to the motor MG2.

During normal HV running or high-load HV running, the vehicle is running in a state in which the engine 2 is being operated, so the oil pump 20 is operated by the output of the engine 2. On the other hand, during EV running, the vehicle is running in a state in which the engine 2 is stopped, so it is not possible to use the output of the engine 2 to operate the oil pump 20 while in EV running. When the oil pump 20 stops and a state in which lubricating oil is not supplied to the power system such as the power division mechanism 4 continues for a fixed period of time, burning and wear of bearings, gears, and so forth occurs, so in this embodiment, control to forcibly start the engine 2 is performed.

As shown in FIG. 1, a register 41 where a flag is set corresponding to the running mode of the vehicle is provided in a memory of the hybrid control controller 33. When the running mode of the vehicle transitions to EV running, the CPU of the hybrid control controller 33 sets a flag '1' in the register 41, and when the running mode of the vehicle transitions to a running mode other than EV running (such as normal HV running or high-load HV running), the CPU of the hybrid control controller 33 sets a flag '0' in the register 41. Also, a first map 42 and a second map 43 are stored in the memory of the hybrid control controller 33. Further, an oil temperature sensor 44 is provided in the power division mechanism 4, and the hybrid control controller 33 is configured to be capable of detecting the oil temperature within the power division mechanism 4.

Figure 3:
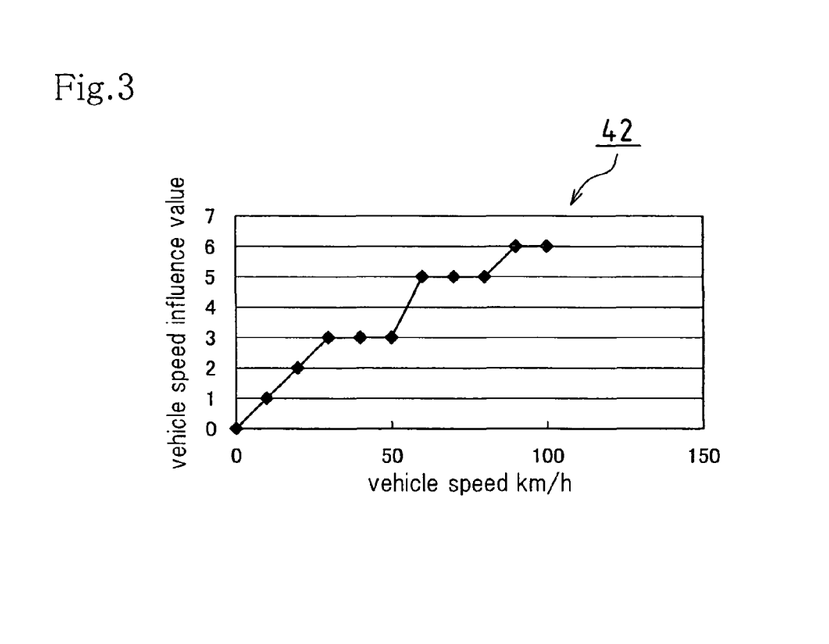
FIG. 3 shows an example of a first map.

As shown in FIG. 3, vehicle speed influence values corresponding to vehicle speeds are set in the first map 42. Higher vehicle speed influence values are set for high speeds than for low speeds. When the running mode of the vehicle is EV running, the hybrid control controller 33 sums the vehicle influence values that correspond to the vehicle speeds of the vehicle from moment to moment. In this embodiment, the hybrid control controller 33 calculates the average vehicle speed at a fixed time interval (1 minute), and sequentially sums the vehicle influence values that have been set corresponding to this average vehicle speed in the first map 42.

Figure 4:
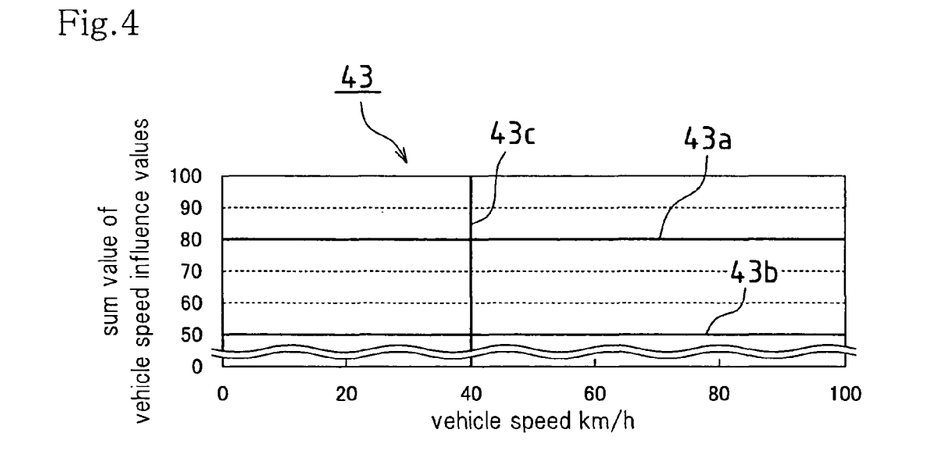
FIG. 4 shows an example of a second map.

As shown in FIG. 4, an EV continuous running limit line 43a, an engine start standby line 43b, and an engine start reference vehicle speed line 43c are set in the second map 43. The EV continuous running limit line 43a is a threshold value (first threshold value) of the above sum value of the vehicle influence values. This is the sum value of the vehicle influence values where running is possible without operation of the oil pump 20, and is a value obtained in advance through testing, simulation, or the like. This EV continuous running limit line 43a preferably has some margin from the above obtained value, such that safe running is possible without heat damage to components (such as the gear elements 10 and 11 of the power division mechanism 4 or the like) where lubricating oil is not supplied due to stoppage of the oil pump 20. The engine start standby line 43b is a threshold value (second threshold value) of the above sum value of vehicle influence values, and is set to less than the first threshold value. For example, the second threshold value is set in a range of 50 to 90% of the first threshold value. The engine start reference vehicle speed line 43c is a vehicle speed used as a reference for judging whether or not it is necessary to start the engine 2 after the sum value of the above vehicle influence values has become no less than the second threshold value. The engine start reference vehicle speed line 43c is desirably a vehicle speed at which it is possible with torque control of the motor MG2 to adequately absorb torque fluctuation transmitted from the engine to the power division mechanism 4 when the engine is started with the hybrid vehicle engaged in EV running. That is, the engine start reference vehicle speed line 43c is desirably a vehicle speed at which there is little occurrence of a delayed response in torque control of the motor MG2.

Figure 5:
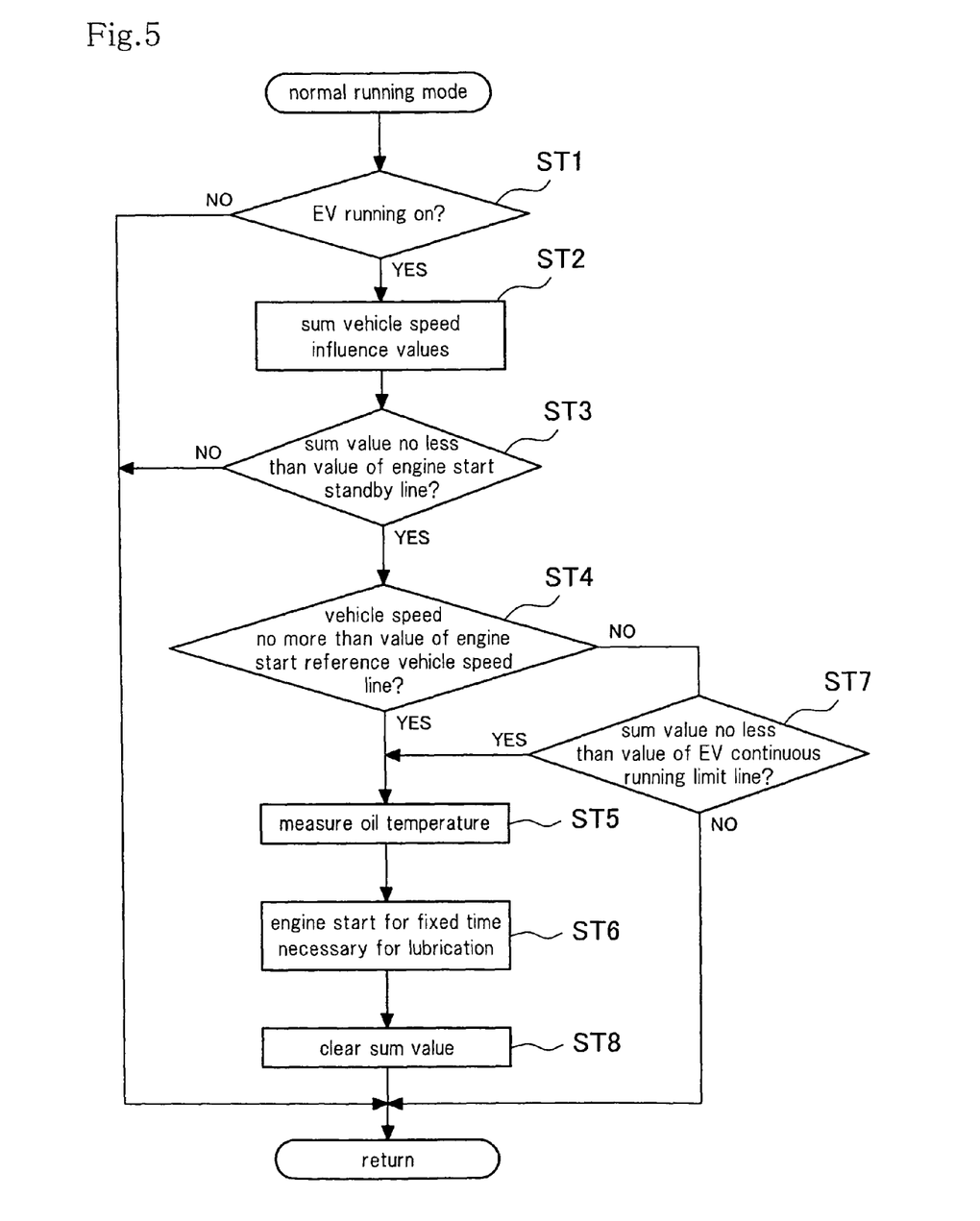
FIG. 5 is a flowchart that illustrates a processing procedure when, while a vehicle running mode is EV running, a hybrid control controller starts an engine and operates an oil pump.

FIG. 5 is a flowchart that illustrates a processing procedure when the hybrid control controller 33 or the like starts the engine 2 and operates the oil pump 20, when the vehicle running mode is EV running.

In Step ST1, the hybrid control controller 33 monitors the flag that is set in the register 41, and performs a check of whether or not the running mode of the vehicle has transitioned to EV running.

In a hybrid vehicle, system design is carried out such that the engine is automatically stopped when, based on the vehicle running circumstances (such as vehicle speed, accelerator opening degree, braking, and shift position), a predetermined engine stop condition is satisfied. Therefore, when the engine stop condition is satisfied, '1' is set in the register 41. As the engine stop condition, it is possible to set a condition such as that (1) a predetermined vehicle speed has not been reached since the start of vehicle movement, (2) the vehicle speed continues to be no more than a predetermined speed for a fixed period of time, (3) the vehicle is judged to be in a state of deceleration or braking from vehicle speed and brake operation information, or (4) EV running has been selected as the running mode of the vehicle by manual operation of the driver.

When the engine stop condition is established in a state in which the engine 2 is operating, the hybrid control controller 33 outputs an engine stop request signal to the ECU 31 to stop the engine 2. The hybrid control controller 33, when detecting that '1' is set in the register 41 (Step ST1; YES), sums, moment by moment, the vehicle speed influence values that have been set in the first map 42 based on the vehicle speeds obtained from output of the vehicle speed sensor 35 (Step ST2). In this embodiment, the hybrid control controller 33 calculates an average vehicle speed at one minute intervals, and also calculates vehicle speed influence values that correspond to the average vehicle speeds based on the first map 42, and sequentially sums the vehicle speed influence values that are calculated. The time interval at which summing is performed is not limited to the time interval described above. Also, instead of the average speed, the hybrid control controller 33 may calculate the instantaneous vehicle speed at each of a predetermined time interval, successively obtain the vehicle speed influence values that correspond to instantaneous vehicle speeds from the first map 42, and sum those vehicle speed influence values.

In Step ST3, the hybrid control controller 33 judges whether or not the sum of vehicle speed influence values is at least as high as the engine start standby line 43b (second threshold value) that is set in the second map 43.

When the result of the judgment in Step ST3 is affirmative, in Step ST4 the hybrid control controller 33 judges whether or not the vehicle speed is no higher than the engine start reference vehicle speed line 43c. On the other hand, when the result of the judgment in Step ST3 is negative, this routine is temporarily omitted.

When the result of the judgment in Step ST4 is affirmative, in Step ST5 the hybrid control controller 33 measures the oil temperature within the power division mechanism 4 from an output signal of an oil thermometer 44, and then advances the processing procedure to Step ST6.

In Step ST6, the hybrid control controller 33 starts the engine 2 via the ECU 31, sets an operation time according to the oil temperature within the power division mechanism 4 that was measured in ST5, and operates the engine 2 for the operation time (fixed time) that was set. That is, due to making an affirmative judgment in above ST3 and also making an affirmative judgment in above ST4, the hybrid control controller 33 judges that engine start is necessary and starts the engine 2. Starting of the engine 2 is performed when the vehicle speed is slower than the engine start reference vehicle speed line 43c. Therefore, revolutions of the motor MG2 are also relatively low, so torque fluctuation (torsional vibration)

that is transmitted from the engine 2 when starting the engine, particularly relatively large torque fluctuation due to initial firing of the engine 2, can be adequately absorbed by torque control of the motor MG2, and also, gear grinding noise of the gear elements of the power division mechanism 4, the reduction mechanism 5, and so forth is suppressed. Note that the above torque control of the motor MG2 is widely known and commonly used technology; and therefore is not described here.

During operation of the engine 2, rotational power of the crankshaft 2a operates the oil pump 20 via the coil spring-type transaxle damper 14, the input shaft 16, the hollow shaft 17, and so forth, and thus oil lubrication within the power division mechanism 4 is performed by the oil pump 20. The operation time (set operation time) of the engine 2 is the time necessary for lubrication. For example, in the hybrid control controller 33, pump operation revolutions for operating the oil pump 20 and information related to the pump operation time are stored in advance in a memory as table information associated with the oil temperature within the power division mechanism 4. The hybrid control controller 33 sets the operation time and the revolutions of the engine 2 according to the above oil temperature.

On the other hand, when the result of the judgment in Step ST4 is negative, in Step ST7, the hybrid control controller 33 judges whether or not the sum of vehicle speed influence values is at least as high as the EV continuous running limit line 43a that is set in the second map 43.

When the result of the judgment in Step ST7 is affirmative, the processing procedure moves to Step ST5. That is, due to making an affirmative judgment in Step ST7, the hybrid control controller 33 judges that engine start is necessary and starts the engine 2. On the other hand, when the result of the judgment in Step ST7 is negative, this routine is temporarily omitted.

After the engine is started in Step ST6, in Step ST8, the hybrid control controller 33 clears the sum of vehicle speed influence values to return to a 0 value, and this routine is temporarily omitted. Note that when the engine 2 is started, a flag '0' is set in the register 41, so during operation of the engine 2, a negative judgment is made in Step ST1, and the procedure from Step ST2 onward is not executed. On the other hand, when the set operation time passes, so that operation of the engine 2 is stopped and the running mode of the vehicle again becomes EV running, a flag '1' is set in the register 41, so the procedure from Step ST2 onward is executed.

According to the hybrid vehicle described above, when the vehicle is run for some time in a state in which lubricating oil is not supplied to the power division mechanism 4, and the sum of vehicle speed influence values is at least as high as the EV continuous running limit line 43a, or the sum of vehicle speed influence values is at least as high as the engine start standby line 43b and the vehicle speed is no higher than the engine start reference vehicle speed line 43c, the engine 2 is started and the oil pump 20 that operates in conjunction with the engine is operated to supply lubricating oil to the power division mechanism 4. Thus, it is possible to prevent burning within the power division mechanism 4. Also, because the oil pump 20 is operated due to operation of the engine 2, power loss due to sliding resistance of the engine does not occur.

Following is a description of two specific examples in which the above processing procedure is performed while the hybrid vehicle described above, in which the control apparatus of a vehicle drive apparatus is installed, is running in the EV running mode.

Figure 6:
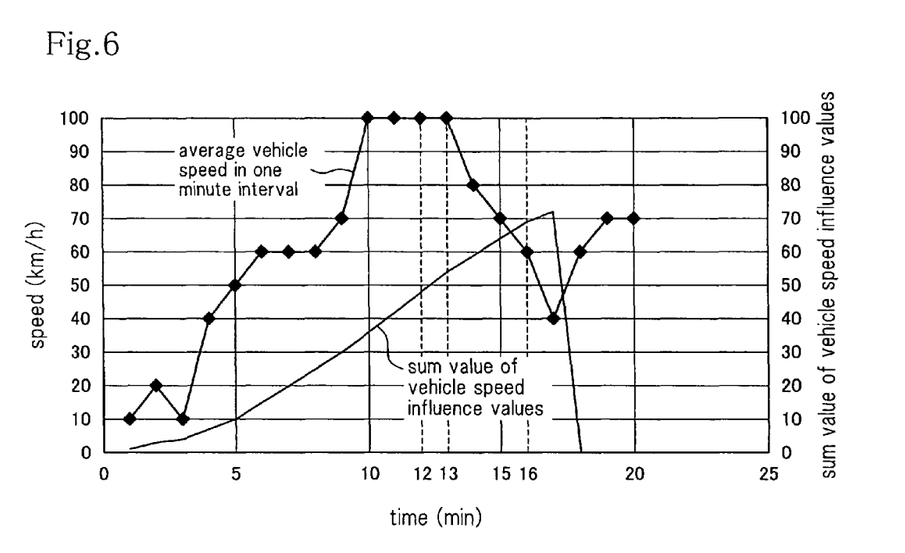
FIG. 6 shows an example of a history of vehicle speeds and sums of vehicle speed influence values of a plug-in hybrid vehicle according to an embodiment of the invention.

The first example will be described with reference to FIG. 6. In FIG. 6, the horizontal axis indicates running time and the vertical axis indicates average vehicle speed or the sum value of vehicle influence values. In this example, the hybrid vehicle has transitioned to the EV running mode from a stopped state and has started running. When the running mode transitions to the EV running mode, '1' is set in the register 41, so the hybrid control controller 33 detects that '1' is set in the register 41 (Step ST1: YES), and vehicle speed influence values corresponding to vehicle speeds are summed from moment to moment (Step ST2).

First, when one minute has passed since the start of summing vehicle speed influence values, the hybrid control controller 33 sums the average vehicle speed during one minute. Here, the average vehicle speed is 10 km/h, and the vehicle speed influence value that corresponds to this average vehicle speed is calculated based on the first map 42. In the first map 42, 1 is set as the vehicle speed influence value associated with the average vehicle speed 10 km/h, so here, the calculated vehicle speed influence value is 1, and a summing process of adding 1 to the initial value 0 is performed.

Thereafter, from the start of summing until 12 minutes have passed, in the example in FIG. 6, the average hourly speed and vehicle speed influence value for each minute are, in order, (20 km/h, 2), (10 km/h, 1), (40 km/h, 3), (50 km/h, 3), (60 km/h, 5), (60 km/h, 5), (60 km/h, 5), (70 km/h, 5), (100 km/h, 6), (100 km/h, 6), (100 km/h, 6), and so the sum value of vehicle speed influence values becomes 48. In this interval, the processing of Steps ST1 to ST3 is repeatedly executed. Here, the first number in parentheses indicates the average vehicle speed, and the second number indicates the vehicle speed influence value set in the first map 42 corresponding to the vehicle speed. The same is true below.

Further, at the point in time that another minute has passed so that 13 minutes have passed since summing was started, the sum value of vehicle speed influence values becomes 54, and thus is not less than 50, which is the value of the engine start standby line 43b that is set in the second map 43 (Step ST3: YES).

Afterward, the average hourly speed and vehicle speed influence value for each minute are, in order, (80 km/h, 5), (70 km/h, 5), and (60 km/h, 5), and at the point in time that 16 minutes have passed since the start of summing of the vehicle speed influence values, the sum value of the vehicle speed influence values becomes 69. In this interval, the vehicle speed is always greater than 40 km/h, which is the value of the engine start reference vehicle speed line 43c, and the sum value of the vehicle speed influence values is always less than 80, which is the value of the EV continuous running limit line 43a, so the processing of Steps ST1 to ST4 and Step ST7 is repeatedly executed.

Further, at the point in time that another minute has passed so that 17 minutes have passed since summing of the vehicle speed influence values was started, the vehicle speed becomes 40 km/h, which is no greater than the value of the engine start reference vehicle speed line 43c (Step ST4: YES), and after the oil temperature has been measured (Step ST5), the engine 2 is started (Step ST6), and the sum value of the vehicle speed influence values is cleared (Step ST8). The engine 2 is operated for the set time, and thus, the oil pump 20 that operates in conjunction with the engine 2 operates, thereby performing oil lubrication within the power division mechanism 4 and so forth.

During operation of the engine 2, a flag '0' is set in the register 41, so a negative judgment is made in Step ST1, and the running count in Step ST2 is not performed. Thereafter, when the engine 2 stops and therefore the running mode again becomes EV running, a flag '1' is set in the register 41, so an affirmative judgment is made in Step ST1, and again the processing procedure from Step ST2 onward is performed.

Figure 7:
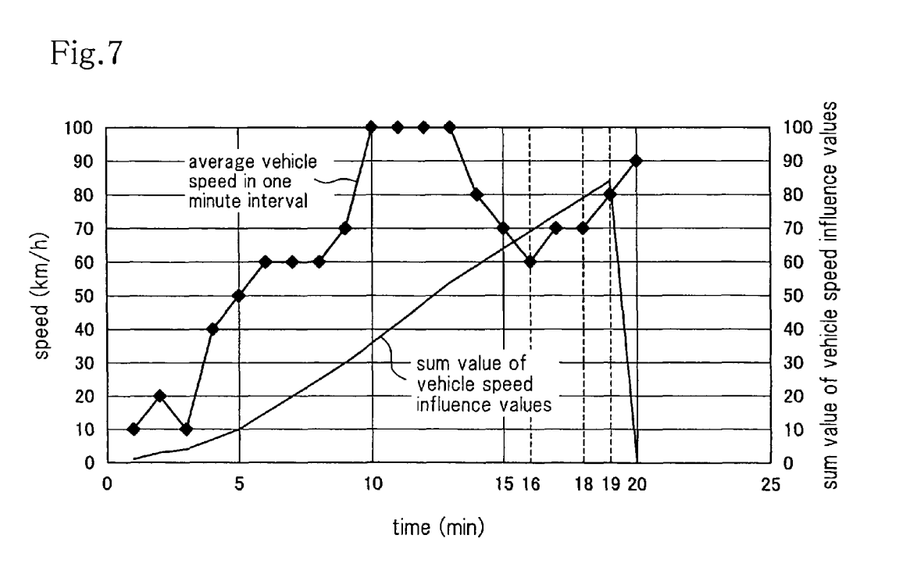
FIG. 7 shows an example of a history of vehicle speeds and sums of vehicle speed influence values of a plug-in hybrid vehicle according to an embodiment of the invention.

The second example will be described with reference to FIG. 7. In FIG. 7 also, the horizontal axis indicates running time and the vertical axis indicates average vehicle speed or the sum value of vehicle influence values. In this example, the hybrid vehicle starts running after transitioning from a stopped state to EV running. When the running mode transitions to EV running, '1' is set in the register 41, so the hybrid control controller 33 detects that '1' is set in the register 41 (Step ST1: YES), and vehicle speed influence values corresponding to vehicle speeds are summed from moment to moment (Step ST2). Until the point in time that 16 minutes have passed since summing of the vehicle speed influence values was started, this example is the same as in the example described with reference to FIG. 6, so a description thereof is omitted here.

From the point in time that 16 minutes have passed since summing of the vehicle speed influence values was started, when the average hourly speed and vehicle speed influence value for each minute are, in order, (70 km/h, 5), and (70 km/h, 5), at the point in time that 18 minutes have passed since summing of the vehicle speed influence values was started, the sum value of the vehicle speed influence values becomes 79. In this interval, the processing of Steps ST1 to ST4, and Step ST7: NO is repeatedly executed.

Further, at the point in time that another minute has passed so that 19 minutes have passed since summing of the vehicle speed influence values was started, the sum value of vehicle speed influence values becomes 84, thus becoming no less than 80 which is the value of the EV running limit line 43a set in the second map 43 (Step ST7: YES), and after the oil temperature has been measured (Step ST5), the engine 2 is started (Step ST6), and the sum value of the vehicle speed influence values is cleared (Step ST8). The engine 2 is operated for the set time, and as previously described, oil lubrication is performed. Also, as previously described, during operation of the engine 2, a flag '0' is set in the register 41, so a negative judgment is made in Step ST1, and the running count in Step ST2 is not performed. Thereafter, when the engine 2 stops and therefore the running mode again becomes EV running, a flag '1' is set in the register 41, so an affirmative judgment is made in Step ST1, and again the processing procedure from Step ST2 onward is performed.

Above, by way of example, a hybrid vehicle having two electric motors was described, but the present invention is also applicable to a hybrid vehicle having only one electric motor. For example, the invention is also applicable to hybrid vehicle having a configuration in which an engine, one electric motor, and a transmission are linked, in this order, in series, and the link between the engine and the electric motor can be severed or established via a clutch, and an oil pump operates in conjunction with rotation of the engine side relative to the clutch. In this type of hybrid vehicle, by releasing the clutch, it is possible to set the running mode to EV running, and by engaging the clutch, for example, to start the engine, it is possible to supply lubricating oil with the oil pump.

In this type of hybrid vehicle as well, when the engine is started during EV running at high speed, it is difficult to absorb torque fluctuation (torsional vibration) that is transmitted from the engine by torque control of the electric motor. However, if the present invention is applied, when the sum of vehicle speed influence values is no less than the value of the EV continuous running limit line, or the sum of vehicle speed influence values is no less than the value of the engine start standby line and the vehicle speed is no higher than the value of the engine start reference vehicle speed line, the engine is started and the oil pump that operates in conjunction with the engine is operated, so it is easy to absorb torque fluctuation that is transmitted from the engine when starting the engine by torque control of the electric motor. Also, it is possible to prevent burning of predetermined components.

Also, as described above, in this embodiment, the invention is applied to a plug-in hybrid vehicle, but this is not a limitation of the invention; it is sufficient that the hybrid vehicle is provided with EV running as a running mode, and the hybrid vehicle may be a vehicle that does not include a charging apparatus for charging a motor/generator battery.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2008-027956 filed in Japan on Feb. 7, 2008, the entire contents of which are herein incorporated by reference.

INDUSTRIAL APPLICABILITY

The present invention is applicable to a control apparatus of an engine and electric motor that are installed in a hybrid vehicle having an oil pump that is operated by rotational power of an output shaft of the engine.

The invention claimed is:
1. A control apparatus of a vehicle drive apparatus provided with a power transmission apparatus for transmitting power of an electric motor to a drive wheel, and an engine linked to the power transmission apparatus, in which EV running that is a running mode of running by only the electric motor while not driving the engine is possible, the control apparatus comprising:
  a storage means that stores vehicle speed influence values that have been set according to vehicle speeds, a first threshold value of a sum value of the vehicle speed influence values, a second threshold value of the sum value of the vehicle speed influence values that is lower than the first threshold value, and an engine start reference vehicle speed;
  a summing means that, when the running mode of the vehicle is EV running, sums the vehicle speed influence values corresponding to vehicle speeds of the vehicle from moment to moment;
  an engine start judging means that judges whether or not starting of the engine is necessary during EV running;
  an engine starting means that starts the engine when the engine start judging means has judged that starting of the engine is necessary; and
  a vehicle speed detecting means that detects the vehicle speed of the vehicle;
  the engine start judging means judging that it is necessary to start the engine in a case where the sum value summed by the summing means is no less than the first threshold value, and in a case where the sum value summed by the summing means is no less than the second threshold value and the vehicle speed detected by the vehicle speed detecting means is no more than the engine start reference vehicle speed, and otherwise the engine start judging means judging that it is not necessary to start the engine.

2. The control apparatus of a vehicle drive apparatus according to claim 1, wherein the moment to moment sum by the summing means of the vehicle speed influence values that correspond to the vehicle speeds of the vehicle is a sum at a fixed time interval of the vehicle speed influence values that correspond to the vehicle speeds of the vehicle.

3. The control apparatus of a vehicle drive apparatus according to claim 1, wherein the vehicle speed influence values are higher at high speeds than at low speeds.

4. A plug-in hybrid vehicle comprising:

the control apparatus of a vehicle drive apparatus according to claim 1; and a charging apparatus for receiving power supply from a household power source and charging a battery for the electric motor.

5. A plug-in hybrid vehicle comprising:

the control apparatus of a vehicle drive apparatus according to claim 2; and a charging apparatus for receiving power supply from a household power source and charging a battery for the electric motor.

6. A plug-in hybrid vehicle comprising:

the control apparatus of a vehicle drive apparatus according to claim 3; and a charging apparatus for receiving power supply from a household power source and charging a battery for the electric motor.

* * * * *